United States Patent [19]

Clothier

[11] 4,075,602
[45] Feb. 21, 1978

[54] LOW TIRE ALARM

[76] Inventor: Darrell S. Clothier, 744 6th Avenue W., Kalispell, Mont.

[21] Appl. No.: 711,501

[22] Filed: Aug. 4, 1976

[51] Int. Cl.² .............................................. B60C 23/08
[52] U.S. Cl. ................................. 340/58; 200/61.24; 200/61.44
[58] Field of Search ................. 340/58, 61; 200/61.22, 200/61.23, 61.24, 61.42, 61.44

[56] References Cited

U.S. PATENT DOCUMENTS

| 2,324,618 | 7/1943 | Dietrich | 200/61.23 |
|---|---|---|---|
| 2,640,119 | 5/1953 | Bradford, Jr. | 340/58 |
| 2,647,967 | 8/1953 | Moot | 200/61.24 |
| 2,882,362 | 4/1959 | Carter | 200/61.24 |
| 3,055,998 | 9/1962 | Collins | 340/58 |
| 3,223,970 | 12/1965 | Lowery | 340/58 |
| 3,602,885 | 8/1971 | Grajeda | 340/58 |
| 3,610,851 | 10/1971 | Krupski | 340/58 |
| 3,984,808 | 10/1976 | Laz et al. | 340/58 |

FOREIGN PATENT DOCUMENTS

| 1,360,300 | 3/1964 | France | 200/61.22 |
|---|---|---|---|

Primary Examiner—John W. Caldwell, Sr.
Assistant Examiner—Joseph E. Nowicki
Attorney, Agent, or Firm—Wells, St. John & Roberts

[57] ABSTRACT

An alarm for indicating low pressure in a ground engaging pneumatic tire of a vehicle. The alarm is operated through the electrical system of the vehicle to warn the vehicle operator of a low pressure condition in one or more of the ground engaging vehicle tires as the vehicle moves along a roadway. A switch arrangement is mounted within a housing at a point on the vehicle closely adjacent to a ground supporting wheel. A feeler member extends downwardly from the housing to an end that is normally held above the ground level when the associated vehicle tire is in a normally inflated condition. The feeler member is pivoted on a shaft within the housing. An integral swing arm extends from the feeler arm to a free end that mounts an electrical contact surface. An integral spring member connects the feeler and swing arm to the housing. The spring resists pivotal movement of the contact surface. An insulator mounts an electrically conductive pad to the housing. A single electrical wire leads from the pad to connect in a series circuit with a lamp and an ungrounded side of the vehicle electrical power supply. Thus, when contact is made with the road surface by the feeler member, a circuit is completed to light the lamp. The feeler may engage the ground only if the adjacent tire becomes deflated to allow the feeler to move downwardly into contact with the ground surface. Upon engaging the roadway surface, the feeler pivots about the shaft axis against resistance of the spring and correspondingly pivots the electrical contact surface into engagement with the pad, grounding the circuit through the vehicle axle. A cushion is held within the housing to effectively seal the housing.

6 Claims, 7 Drawing Figures

LOW TIRE ALARM

BACKGROUND OF THE INVENTION

This invention relates to vehicle warning apparatus and more particularly to such apparatus for indicating a low air pressure condition within a pneumatic tire while the associated vehicle is moving along a roadway.

It is very difficult to detect by "feel" the presence of a low pressure tire, especially in heavy trucks (multiple tires) or a trailing vehicle. However, it is important to be constantly aware of the tire conditions since serious accidents may result should one of the tires go flat. This is true especially of a towed vehicle that will often include only two such tires and a single connecting point between it and the towing vehicle. Further, even low tire pressure is hazardous in towed vehicles since they have a tendency to pull in the direction of the low pressure tire and therefore swerve in that direction. It is therefore desirable to obtain some means to indicate to the vehicle operator when a low pressure exists in one or more of the vehicle or towed vehicle tires.

U.S. Pat. No. 3,055,998 to S. L. Collins discloses a tire deflation indicator. Collins uses an indicator box at each vehicle wheel. Each box includes a housing that is fastened by straps to the associated vehicle axle. The housing rotatably mounts a shaft that includes a hub protruding outwardly of the housing. A feeler rod is mounted to the exposed hub for engaging the ground and turning the shaft when the adjacent tire becomes deflated. The shaft is held in a normal upright condition by a separate coil spring. An arm is fixed to the shaft within the housing to swing into engagement with an electrical switch actuator in response to pivotal movement of the feeler rod. The arm is turned when the feeler rod engages the ground. A signal device is electrically connected to the switch and is located within the vehicle to provide early warning to the operator that a tire is going flat.

U.S. Pat. No. 3,647,967 to Moot discloses a low tire indicator. It shows a contact finger on a ground engaging rod. A ball at the bottom of the rod lifts the rod and its associated hinge block up and laterally when the ball strikes the ground. This moves an upper tip of the rod against an electrical contact to complete a circuit and signals the operator of the associated vehicle of a low tire condition.

U.S. Pat. Nos. 1,947,760, 2,763,743, and 2,213,782 all relate to tire pressure warning devices that actually sense the low pressure condition. They do this by providing switch actuator arms that engage the bulging side of a tire as it begins to go flat.

U.S. Pat. No. 3,096,410 to Anderson discloses a rather complex low tire warning device. It includes a coiled spring earth contacting arm 50 which includes a switch element. This element operates another switch mechanism in a box mounted to the associated vehicle axle.

U.S. Pat. No. 3,413,593 to Uphoff shows a ground contacting feeler arm mounted to an axle adjacent a wheel. The arm bends in response to contact with the roadway surface to actuate an electrical switch. The switch is enclosed in a waterproof covering.

U.S. Pat. No. 3,072,759 to Kreps shows a trailer flat indicator. A stationary switch member and a movable switch member is mounted to a ground engaging spring arm. The lower end of the spring arm which comes into ground contact is constructed of belting. The two contacts provide an electrical ground to the trailer frame for a signal circuit when they are engaged.

The present alarm basically differs from the above described apparatus in its simplicity of design and function. It includes only one moving part, the ground engaging rod. This rod constitutes a conductor to ground a warning circuit to the vehicle axle. The rod is normally held away from contacting a simple, single piece conductor pad by an integral spring member. A rubber filler helps provide a watertight seal to the housing that encloses the conductor pad. Since the rod serves as a grounding conductor in the warning circuit, only one wire need be connected to the vehicle wiring system, on the ungrounded side of the vehicle electrical supply. The electrical contact elements are well insulated and sealed to assure proper functioning in all weather and roadway conditions.

SUMMARY OF THE INVENTION

A low tire alarm is described for vehicles that include ground supporting pneumatic tires. The alarm includes a hollow housing with a clamp means thereon adapted to mount the housing to a vehicle axle adjacent a ground engaging tire. A shaft extends through the hollow housing to pivotably receive an elongated electrically conductive rod. The rod includes a coiled central portion that is pivoted freely on the shaft about its central axis. The rod includes an integral swing arm portion that extends outwardly from the shaft within the housing. The swing arm includes an integral electrical contact surface at an outer end thereof. The rod also includes an integral spring member that operates against the housing to resist pivotal movement of the rod about the shaft axis. The rod also includes an integral feeler extension that projects outwardly from the shaft and outwardly of the hollow housing. It is connected integrally to the swing arm and spring member so that pivotal movement of the feeler about the shaft axis causes corresponding movement of the swing arm and electrical contact. An electrically conductive pad is mounted by an electrical insulator to the inside surface of the housing in the path of the electrical contact on the swing arm. An insulative cushion means is provided in the housing to seal the housing. A conductor is connected to the conductive pad and extends outward of the housing to connect in a circuit to a signal producing means and the ungrounded terminal of a grounded source of electrical energy.

It is an object of the present invention to provide an indicator or alarm for visually or otherwise indicating to a vehicle operator that a ground engaging pneumatic tire has reached a dangerously low air pressure while the vehicle is in a forward motion.

A further object is to provide such an alarm that is extremely simple in construction, is easy to mount to existing vehicles, and is inexpensive to purchase.

A still further object is to provide such an alarm that is relatively safe in that it can not be easily shorted to ground and thereby relay an inaccurate warning signal to the vehicle operator.

These and still further objects and advantages will become apparent upon reading the following description which, taken with the accompanying drawings, describe a preferred form of my invention. It is to be noted however, that the drawings and following description are not intended to place restrictions upon the scope of my invention. It is the purpose of the claims attached at the end of this specification to define the scope of my invention.

DETAILED DESCRIPTION OF A PREFERRED EMBODIMENT

Figure 1:
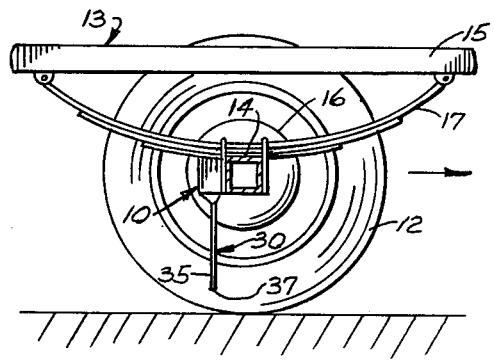
FIG. 1 is a fragmentary view of the present invention shown mounted to an axle adjacent a ground engaging pneumatic tire.
Figure 2:
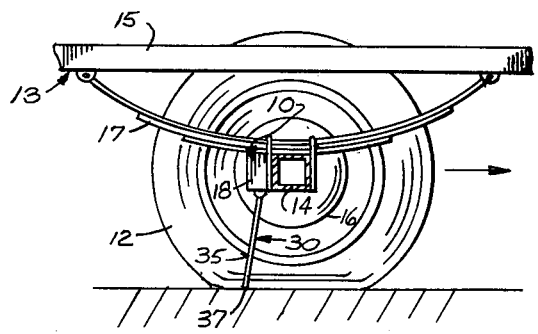
FIG. 2 is a view similar to FIG. 1 only showing a tire in a deflated condition and the alarm in an actuated position.

The present invention is illustrated in the accompanying drawings and is generally designated therein with reference character 10. The present alarm 10 is designed to indicate to a vehicle operator when a specific pneumatic tire 12 of the associated vehicle 13 is losing air pressure while the vehicle is moving in a forward direction. The correctly inflated tire is illustrated in FIG. 1 and a low pressure tire is illustrated in FIG. 2.

It is intended that the present alarm system be utilized preferably with trailing type vehicles such as boat trailers, utility trailers, house trailers, etc. Such trailers have one or more transverse axles 14 that are movably attached to a frame 15 through a spring suspension 17. The axles mount the pneumatic tires 12 on freely rotatable hubs 16. The spring suspension 17 interconnects the axle with the vehicle frame to absorb shock loads and isolate vertical wheel movement from the frame 15.

The present alarm 10 includes an enclosed metallic housing 18 that is mountable to an axle 14 for movement with the tire 12. The housing 18 is comprised of two separate sections. A base section 19 of the housing mounts a cover section 20. A clamp means 21 is provided on the base portion 19 to securely mount the housing to axle 14.

Clamp means 21 is comprised of a flexible strap 23 that extends through appropriate slots in base 19. A tightener 25 releasably engages opposite ends of the strap 23. Disengaged ends of the strip may be wrapped around an axle 14. The tightener 25 may then be utilized to connect the strap ends and tighten the strap securely about the axle 14. Flexibility of the strap assures a firm grip of the clamp means against the axle to hold the housing in place.

A shaft 26 extends through the housing 18. Shaft 26 is cylindrical and formed of an electrically conductive material. It includes capped ends 27 that secure it within the housing 18. The central axis of shaft 26, when the housing is mounted to an axle 14, is substantially parallel to the axis of rotation for the associated pneumatic tire 12.

An electrically conductive rod 30 is mounted to shaft 28. Rod 30 includes a central coil portion 31 that is wrapped loosely about the shaft 26. Portion 31 enables free pivotal movement of the rod 30 about the shaft axis.

A spring arm member 33 is integral with the rod 30. It extends outwardly from the coiled portion 31 toward the cover section 20 of the housing. The purpose for spring member 33 is to resist pivotal movement of the rod about the shaft axis.

The rod 30 includes a protruding swing arm portion 32 that has at an outer end, an electrical contact surface 34. Rod 30 also includes an outwardly projecting feeler arm portion 35. Feeler arm portion 35 extends outwardly of the housing 18 to a ground sensing end 37. The swing arm portion 32 and feeler arm portion 35 extend in opposite directions from the coil portion 31. Pivotal movement of the feeler arm portion 35 causes corresponding movement of the contact surface 34 in an arcuate path within the housing 18. Sleeves 36 are loosely mounted on the shaft at opposite sides of the coiled portion 31 to prevent axial movement of the rod along the shaft axis.

A flexible rubber boot 40 is received in an appropriate slot 38 in housing 18 to enable pivotal movement of the feeler arm within housing 18 while providing a moisture-proof seal for the housing interior.

Figure 5:
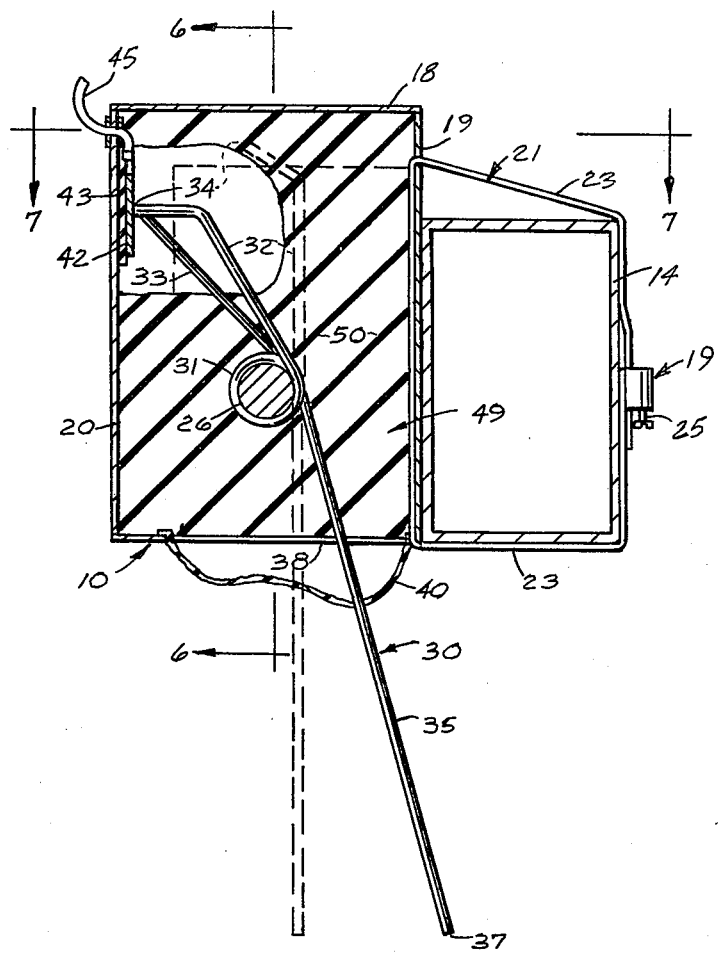
FIG. 5 is an enlarged sectional view.
Figure 6:
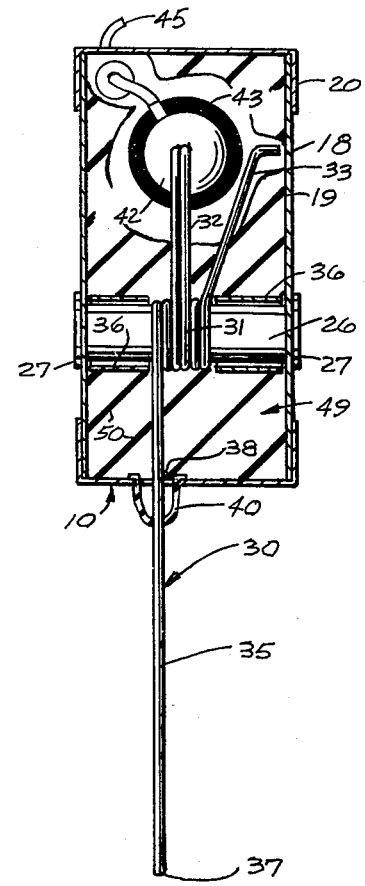
FIG. 6 is a sectioned view taken substantially along line 6—6 in FIG. 5.
Figure 7:
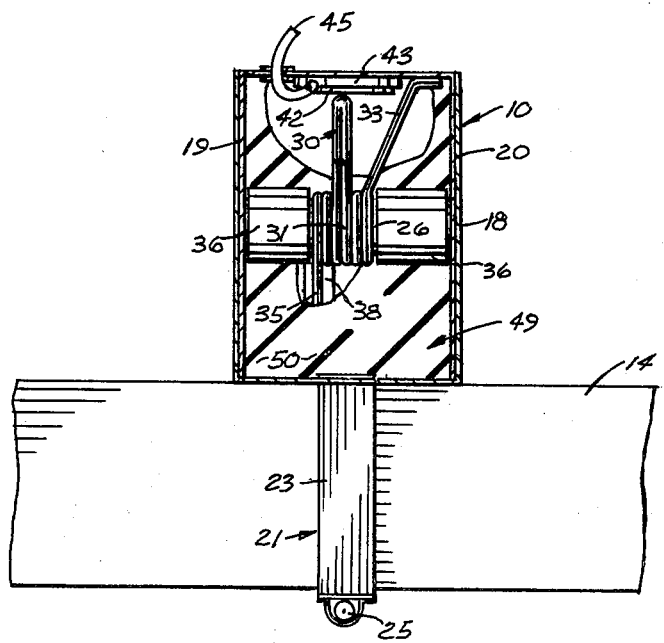
FIG. 7 is a view taken along line 7—7 in FIG. 5.

Inside the housing 18, is an electrically conductive pad 42. An insulator 43 mounts the conductive pad 42 to the housing 18 in the path of electrical contact surface 34. Thus, when the swing arm is pivoted to the left from the dotted position against resistance offered by spring member 33, as seen in FIG. 5, the contact surface 34 may make electrical contact with the conductive pad 42.

A covered electrically conductive wire 45 is connected to the conductor pad 42. It leads from the housing 18 to a signal producing means in the form of an electric lamp 47. Wire 45 is connected to one terminal of the lamp 47. The remaining lamp terminal is connected by a conductor wire 53 to a source of electrical energy such as the battery indicated at 55. The conductor 53 connects electrically to an ungrounded terminal 57 of battery 55. The remaining terminal is grounded at 58.

A resilient insulative cushion means 49 is provided within the housing 18 to seal the housing and keep the contacts 34 and 42 dry. Means 49 may be comprised of a foam rubber or other foamed resilient material 50 that fills the entire housing area adjacent the swing arm and shaft except for an open pocket between pad 42 and contact 34.

Figure 3:
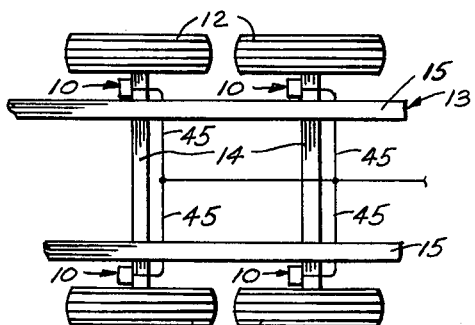
FIG. 3 is a fragmentary diagrammatic view illustrating the placement of several alarm units on a four-wheel vehicle.

FIG. 3 schematically illustrates the positioning of several housings 18 on a vehicle 13 having four tires 12 and two axles 14. Each housing 18 is mounted to an axle 14 directly adjacent one of the tires 12. In this instance, the conductor wires 45 are connected in parallel with the lamp so that a completed circuit through any one may operate the associated lamp 47.

Figure 4:
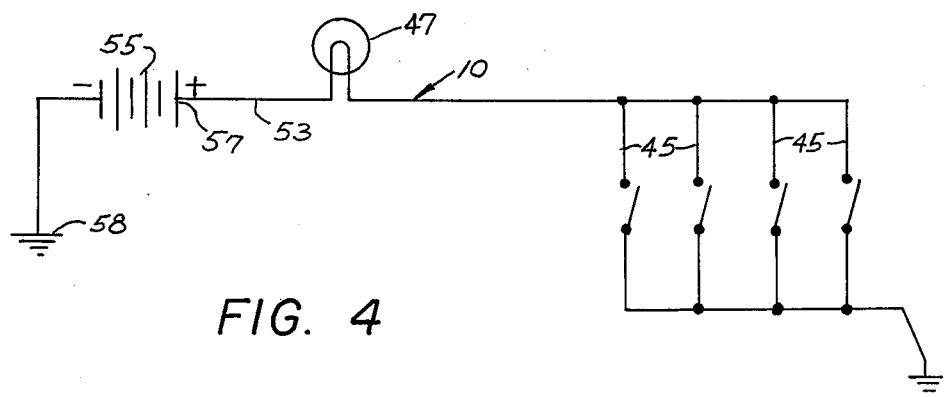
FIG. 4 is an electrical schematic illustrating the preferred electrical connection of several alarms with a source of electrical energy.

FIG. 4 is an electrical schematic illustrating a simple arrangement by which the four sets of electrical components of housing 18 are connected to the lamp 47 and source of electrical energy. It is understood that a separate lamp could be provided for each unit with each lamp connected to a separate wire 45. In this manner, the vehicle operator could be warned of exactly which of several tires is becoming dangerously low.

It is important that the housing 18 be properly mounted to the axle 14. This is done first by positioning the housing on the axle with the strap 23 loosely engaged about the axle cross section. The housing may be situated on the axle, as permitted by the disconnected clamp means 21, so the ground sensing end 37 of feeler arm 35 is located a desired distance above ground level. This distance may vary with the nature of the vehicle and tire size.

Once the ground sensing end 37 of feeler arm portion 35 has been properly located, the tightener 25 may be operated to secure the strap 23 and housing in a stationary position on the axle 14. As shown in FIG. 3 this operation may be performed for each tire of the vehicle. Again, if several units are to be utilized as shown in FIG. 3, the conductor wires 45 may be connected in a parallel circuit as shown in FIG. 4. A single wire may then lead to the lamp 47 which is preferably located or adapted to be mounted within the vehicle adjacent to the operating station. The conductor wire 53 extending from lamp 47 may then be connected to the ungrounded side of battery 55. Once this simple installation is complete, the alarm 10 is then set for operation.

As the vehicle 13 moves in a forward direction down a roadway, and as air leaks from one or more tires 12, the associated feeler arm(s) comes closer to the ground surface. Finally, when the tire reaches a dangerously low air pressure level, the ground sensing end 37 will make contact with the ground surface. Since the vehicle is moving in a forward direction, the feeler arm is forced to pivot about the shaft 26 against resistance offered by spring member 33 (FIG. 2). Movement of the feeler arm portion 35 causes corresponding movement of the swing arm portion 32, bringing the contact surface 34 into electrical contact with the conductor pad 42. This contact completes an electrical circuit through the rod 30 to the associated axle 14 (ground) and the lamp 47 becomes lighted. This warns the operator that a low pressure condition exists in one of the vehicle tires. Once the tires are reinflated to a safe pressure, the feeler arm will disengage the ground surface and will automatically swing back to a normal position wherein the contact surface 34 is spaced from pad 42.

It may have become obvious from the above description and attached drawings that various changes and modifications may be made therein. Therefore only the following claims are to be taken as definitions of my invention.

What I claim is:

1. A low tire alarm for warning the operator of a forwardly moving vehicle of the type having one or more axle supported ground engaging pneumatic tires that one or more of the tires is at least partially deflated, said alarm comprising:

a hollow housing;

clamp means on the housing adapted to mount the housing to a vehicle axle directly adjacent a ground engaging tire thereof;

a shaft extending through the housing and substantially parallel with the axis of rotation for the tire;

an elongated electrically conductive rod having a coiled central portion wrapped loosely about the shaft such that the rod will pivot freely about the shaft axis;

wherein the rod includes an integral swing arm portion within the housing that protrudes from the coiled portion;

said swing arm including an electrical contact surface at a free end thereof movable with the swing arm in an arcuate path about the shaft axis;

said rod further including an integral feeler arm portion protruding from the coiled portion through an aperture in the housing to a free ground sensing end that is outside the housing;

an electrically conductive pad;

an insulator mounting the pad within the housing in the path of the electrical contact surface;

said rod further including an integral spring member engageable with the housing to resist pivotal movement of the electrical contact surface toward the electrically conductive pad;

an insulative foam resilient seal means for hermetically sealing the interior of the housing to seal the housing and keep the electrically conductive pad dry while enabling the rod to pivot about the shaft axis;

a conductor wire connected to the pad;

signal producing means connected to the conductor wire and adapted to be electrically connected to a grounded source of electrical energy for producing a signal when the free ground sensing end of the rod engages the ground and causes the rod to pivot about the shaft axis against the resistance of the integral spring member and swing the electrical contact surface of the swing arm into contact with the electrically conductive pad.

2. The alarm as recited by claim 1 further comprising a watertight boot means connecting the feeler arm portion and housing to allow movement of the feeler arm and to seal the housing interior.

3. The alarm as recited by claim 1 wherein the signal means is an electric lamp.

4. The alarm as recited by claim 1 wherein the swing arm and feeler extension extend in opposite directions from the coiled portion.

5. The alarm as recited by claim 1 wherein the housing is comprised of a base that mounts the clamp means and a cover that mounts to the base.

6. The alarm as recited by claim 1 wherein spacer sleeves are provided on the shaft between the coiled portion of the rod and the housing to prevent axial movement of the rod on the shaft.

* * * * *